July 26, 1960

L. BRUEHL 2,946,316

HYDRAULIC CYLINDER AND PISTON

Filed March 5, 1953

INVENTOR.
LAWRENCE BRUEHL
BY
Robert S. Dunham
ATTORNEY

July 26, 1960

L. BRUEHL 2,946,316

HYDRAULIC CYLINDER AND PISTON

Filed March 5, 1953

INVENTOR.
LAWRENCE BRUEHL

BY Robert S. Dunham

ATTORNEY

United States Patent Office 2,946,316
Patented July 26, 1960

2,946,316

HYDRAULIC CYLINDER AND PISTON

Lawrence Bruehl, Vestal, N.Y., assignor to International Business Machines Corporation, New York, N.Y., a corporation of New York Filed Mar. 5, 1953, Ser. No. 340,451

8 Claims. (Cl. 121—38)

This invention deals with a combination involving, and an improvement for, a hydraulic cylinder and piston. Such a hydraulic cylinder and piston may have countless uses. Among the uses contemplated is to use the cylinder and piston as the elevation cylinder for a gun which is mounted on trunnions, e.g. the turret gun of a tank.

A combination of this invention involves a cylinder and piston in which the cylinder includes a gimbal mounting which has passages for the hydraulic fluid in the gimbals so that no flexible tubing or similar loose elements are necessary to connect the hydraulic lines to the cylinder.

An object of the invention is to provide an improved cylinder and piston wherein there is substantially no leakage of fluid past the piston. In order to accomplish this a differential pressure type of ring commonly known as an O ring is employed.

Another object of the invention is the provision of a shock absorbing device built onto the cylinder which will act to relieve excessive pressure in the hydraulic fluid caused by shock or excessive loads either in compression or in extension of the cylinder and piston. Such relief is accomplished by an elastic means so that upon the cessation of the overload, the piston will be returned to its original position, relative to the cylinder, that it occupied when the overload was applied.

To these and other ends, the novel features and principles of my invention may be readily understood from the following description and accompanying drawings of one advantageous embodiment, set forth by way of example.

Figure 1:
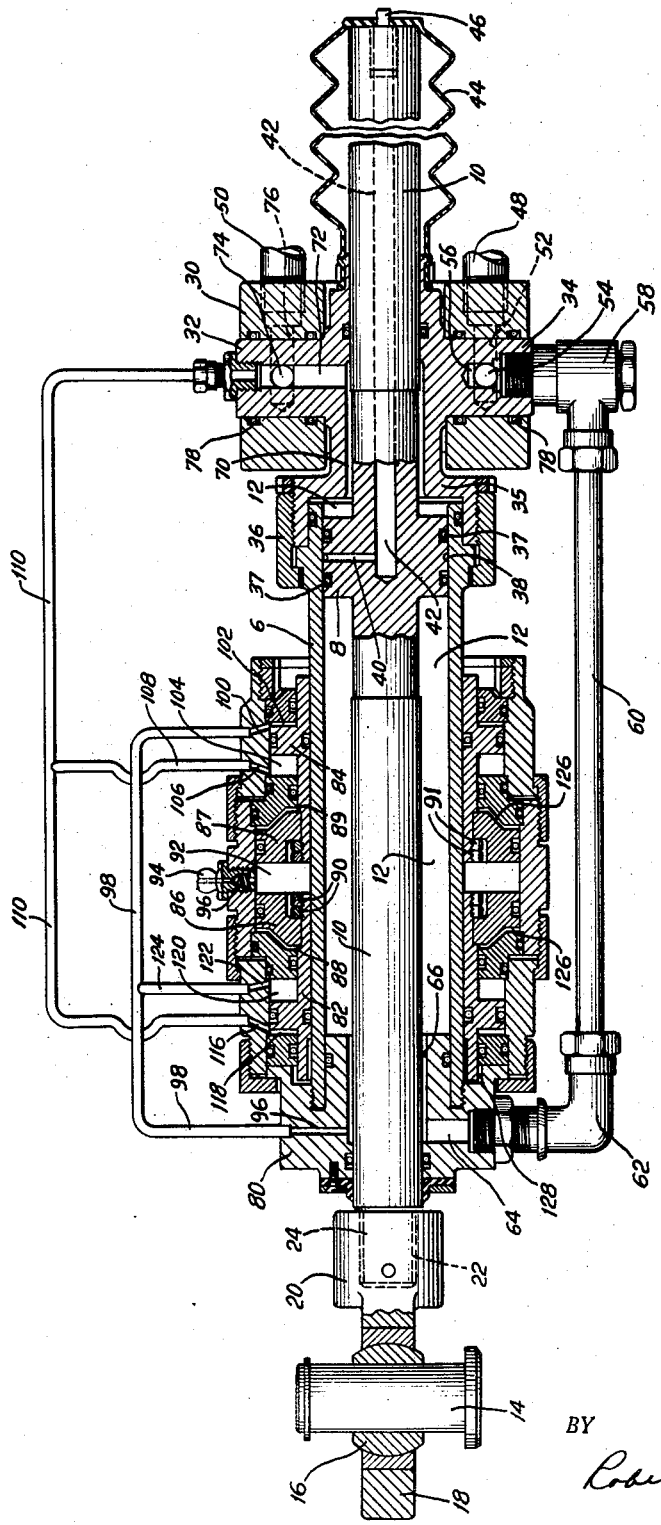
Fig. 1 is a longitudinal view showing the cylinder and related parts in cross-section.

The basic elements of the hydraulic cylinder and piston unit of this invention are illustrated in Fig. 1. There is a cylinder 6, a piston 8, and a piston rod 10 which extends out of the cylinder 6 at both ends so that the unit is a no-differential type cylinder and piston, that is, there is an equal area to which pressure is applied by the hydraulic fluid on each side of the piston 8. This is because the piston rod 10 extends in both directions from the piston and thereby the piston presents an equal area on either of its ends to the fluid in a chamber 12 inside the cylinder 6. It will be noted that the right-hand end of piston rod 10 (as viewed in Fig. 1) is shown broken. The actual length of this end of the piston rod must be sufficient to maintain the chamber 12 sealed when the unit is fully extended with the piston 8 at the other end of the chamber 12 from that illustrated in Fig. 1.

Figure 3:
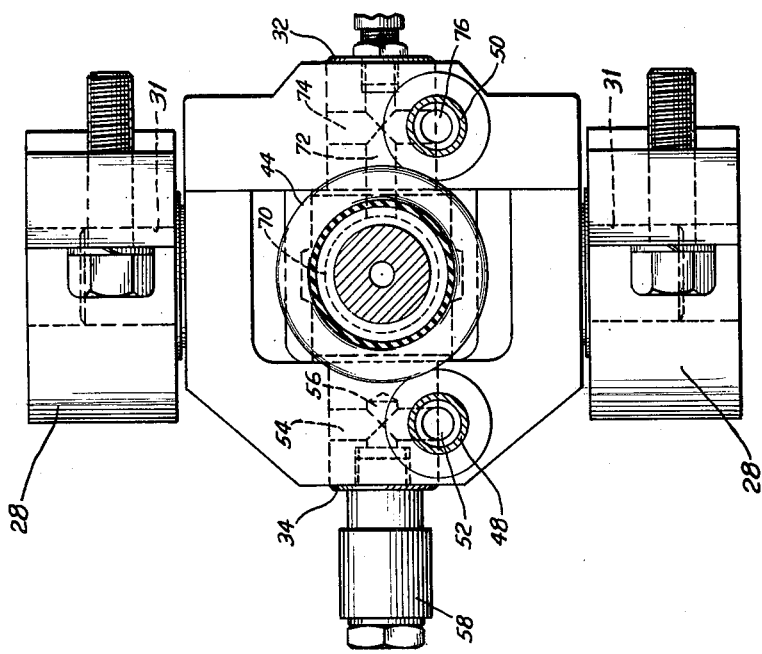
Fig. 3 is an enlarged end elevation with the piston rod and bellows in cross-section, showing the same mounting brackets and details of the hydraulic fluid passages.
Figure 2:
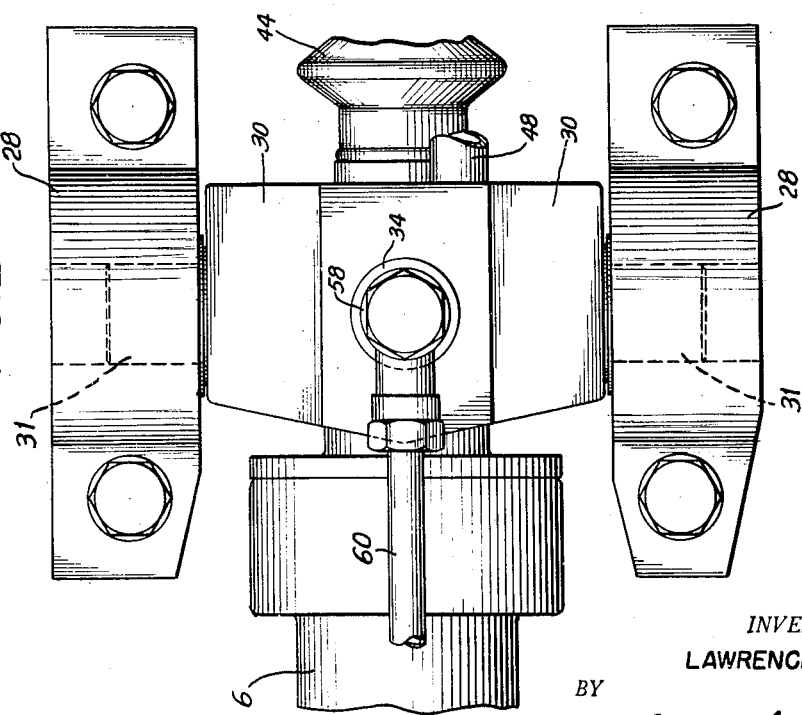
Fig. 2 is an enlarged bottom view of the gimbal mounting brackets.

There is a pin 14 for connecting the piston rod 10 to any device (not shown) which is to be controlled by the unit. This pin 14 is held in a spherical bearing 16 which in turn is contained by a ring 18 having a collar-like hub 20 attached thereto. This hub 20 has a threaded recess 22 into which a threaded portion 24 at one end of the piston rod 10 fits. The attaching means for cylinder 6 consists of a pair of brackets 28 (Figs. 2 and 3) and a gimbal ring 30 having a pair of hubs 31 journaled in brackets 28. Located at right angles to these hubs 31, there is a pair of bearings in the gimbal ring 30. These bearings support a pair of hubs 32 and 34 which, in turn, are integral with the cylinder 6, i.e. these hubs 32 and 34 are integral with a cap 35 which fastens onto the cylinder 6 by means of a threaded clamp action collar 36 and related parts as clearly illustrated.

It will be appreciated that, with these attachments for the unit, there will be complete freedom from binding in any position of extension of the cylinder and piston when in use. This is because of the universal action of both the gimbal bracket mounting (brackets 28, gimbal ring 30 and swivel joints) for the cylinder, and the spherical bearing 16 which supports the coupling pin 14 and which bearing 16 is carried by the piston rod.

One of the features of this invention comprises the vent means which operates in conjunction with a pair of sealing rings 37 on the piston 8. There is a groove 38 located on the periphery of piston 8 between the two sealing rings 37. Connected to this groove 38 is a passage 40 which joins axial passage 42. This passage 42 is most conveniently located along the axis of piston rod 10 and extends from the free end of the piston rod, i.e. the end opposite to that which carries the connecting ring 18 and pin 14, so that it opens out to the atmosphere. There is a bellows covering 44 which protects the end of piston rod 10 from dust and dirt. This covering 44 has a vent opening 46 at the end of the piston rod 10 in order to allow free access to the atmosphere from the passages 42, 40 and the groove 38. The purpose of these passages will become evident as the description of this portion of the device proceeds. Sealing rings 37 may be composed of any suitable material which is impervious to attack by the hydraulic fluid being used, and which is suitably pliable and resilient. Such sealing rings are commonly known as O rings and are effective to produce a substantially leak-proof seal for hydraulic fluid. To operate properly, however, there must be a substantial differential of pressure on the two sides of any given sealing ring of this type. Therefore, a substantially leak-proof piston may be had by means of the sealing rings 37 having a clear passage to the atmosphere on one side of each of these rings while the other side of each ring 37 is subjected to fluid under pressure. This is accomplished by the groove 38 and the passages 40 and 42 just described, so that a superior cylinder and piston unit is had, which completely obviates any leakage of hydraulic fluid by the piston during operation of the whole unit.

Another feature of this invention lies in the provision of passages for the hydraulic fluid which are contained in the gimbal mounting of the cylinder 6, as will presently appear. Hydraulic fluid will be introduced to the unit through either a hydraulic pipe 48 or a similar hydraulic pipe 50, depending upon whether the piston is to be driven to expand the cylinder and piston unit or to contract the unit to a relative position such as that illustrated in Fig. 1. As is the case in any ordinary hydraulic system, there is a circulating pump (not shown) which tends to force fluid to flow from the pump to the pressure lines or pipes of the system and tends to draw fluid from the reservoir or sump to which the return lines or pipes of the system are connected. Then, if the apparatus being hydraulically actuated by the system, is a cylinder and piston unit (as in the instant disclosure) there must be provided merely a suitable valve arrangement (not shown) for selectively applying the pressure side of the system to one of the pipes 48 or 50 and the return side to the other. If more fluid is being introduced by means of the hydraulic pipe 48, i.e., if pipe 48 is connected to the pressure side of the system, fluid will flow through a passage 52, the center line of which is tangent to the surface of hub 34. Then, there is a further passage 54 which passes through the hub 34 at right angles to its axis and which is in alignment with passage 52 in order to freely connect therewith. The fluid path then continues by means of an axial passage 56 in the hub 34 which also intersects the right angle passage 54. Passage 56 leads out the end of hub 34 and fluid will flow through a right angle coupling member 58 and then through a hydraulic pipe 60 to another right angle coupling 62. From coupling 62, fluid will flow to a passage 64 which joins a chamber 66 which surrounds the piston rod 10 and which leads into the left end of chamber 12 (as viewed in Fig. 1) inside the cylinder 6 on one side of the piston 8. When fluid is introduced by means of the path just described, piston 8 will be displaced within cylinder 6 and will cause fluid to flow out of the other end of chamber 12 by the action of the piston 8 and because the other pipe 50 will be connected to the return side of the hydraulic system as explained above. Therefore, fluid will follow a similar path in a reverse manner via a chamber 70 similar to chamber 66 and then an axial passage 72 in the hub 32. From there, the fluid flows through a passage 74 at right angles to the axial passage 72 and then to a passage 76, the center line of which is tangent to hub 32 and which is in alignment with cross passage 74. See Fig. 3 for another view of these passages. Finally, the fluid will continue its return path in the hydraulic system through hydraulic pipe 50.

It will be observed that there are appropriate seals 78 around the hubs 32 and 34 in the proper location to provide a tight sleeve for preventing any leakage of the hydraulic fluid at these swivel joints. It will be evident to one skilled in the art that the same type of fluid passage may be constructed within the swivel joints comprising hubs 31 of the gimbal ring 30 and brackets 28. Such passages would be constructed in a similar manner as those passages just described which carry the fluid through the swivel joints between hubs 32, 34 and the gimbal ring 30. In the instant embodiment of the cylinder and piston unit just described, it was found sufficient to make use of the fluid passages through only the first, or inner, swivels of the gimbal mounting.

Another feature of this invention lies in the provision of a shock absorbing device which may be a separate unit from the cylinder and piston to which it is applied, but which we have found to be most advantageously constructed surrounding the cylinder as illustrated in Fig. 1. This shock absorber unit is structurally made up of a number of rings and clamps which are threaded together in a manner that will be clear from an inspection of the drawings and the description which follows. The elements of the shock absorber make up a shell which surrounds cylinder 6 and is rigidly fastened to a cap 80 which, in turn, threads onto the other end of the cylinder 6 from the cap 35 previously described. Within this shell there are two moving parts consisting of a sleeve-like piston 82 and a similar sleeve-like piston 84. Each of these pistons 82 and 84 has securely clamped to its inner edge an annular flange-like member 86 and 87 respectively which are clamped against shoulders 88 and 89 respectively on the pistons 82 and 84 by means of two pairs of clamping and locking rings 90 and 91 respectively. Each of the flange-like members 86 and 87, therefore, moves integrally with its corresponding piston 82 or 84. Between these flanges 86 and 87 there is formed a chamber 92 which is charged with the gas under pressure by means of an inlet 94 containing a check valve 96. This chamber 92 will be charged with gas under pressure, the magnitude of the pressure applied depending upon the desired stiffness of the shock absorbing action. However, it will be evident that there must be sufficient gas pressure to create a force somewhat above that applied by the hydraulic fluid of the system under its normal pressure.

The action of the shock absorbing device then is such that, when an overload due to shock or other cause, is applied to the cylinder and piston unit, either in expansion or compression of the unit, the excessive pressure on the hydraulic fluid located on one side or the other of piston 8, which is produced by such overload, will be relieved in a manner now to be described. For example, if an overload in expansion of the unit were applied, piston 8 would tend to move to the left as viewed in Fig. 1, and thereby cause excessive pressure on the hydraulic fluid in chamber 12 on the left-side of piston 8. This pressure will be transmitted by the hydraulic fluid through the chamber 66 at the end of chamber 12, and a passage 96 which is connected to the chamber 66. Then this same pressure will be transmitted by a hydraulic pipe 98 to the passage 100 which leads to an annular chamber 102 on the right side of the sleeve-shaped piston 84 (as viewed in Fig. 1). If this fluid pressure is sufficient to overcome the force being applied by the gas under pressure in chamber 92, which tends to maintain sleeve-shaped piston 84 in its extreme position illustrated, the piston 84 will be moved to the left (as viewed in Fig. 1) against this pressure in chamber 92 (since the flange 87 carried by piston 84 moves therewith) and fluid will be forced out of an annular chamber 104 through a passage 106 and then through a hydraulic pipe 108 to enter another hydraulic pipe 110 leading to the main hydraulic chamber 12 on the right-hand side of the piston 8 (as viewed in Fig. 1). This passage of fluid to the right-hand end of chamber 12 may be traced from hydraulic pipe 110 to the axial passage 72 in the hub 32 and then via the chamber 70 into the main chamber 12. It will now be clear that this action of a transfer of hydraulic fluid from the left side of piston 8, and a similar transfer of fluid to the right side of piston 8, will cause piston 8 to be displaced within its chamber 12 inside of cylinder 6. But this displacement will be only the amount as determined by the movement of sleeve-shaped piston 84, which took place against the force of the compressed gas in chamber 92, so that, as soon as the overload is dissipated or reduced, the force of the compressed gas in chamber 92 will return sleeve-shaped piston 84 to its extreme position as illustrated, and the hydraulic fluid will be forced back into chamber 12 on the left side (as viewed in Fig. 1) of piston 8 while fluid is concurrently allowed to flow out from the right end of chamber 12 into the space in annular chamber 104 from which it originally came, so that main piston 8 will be returned to its original location in the cylinder 6 which it occupied before the overload was applied.

In order to make the action of the shock absorber unit entirely clear, let us assume the reverse conditions from that just explained and trace the action (the flow of hydraulic fluid) when an overload appears. In this instance, let us assume that the unit is somewhat extended, i.e. that piston 8 is in a more or less central position within chamber 12. Now, if an overload due to shock or other cause is applied in compression, tending to force piston 8 from its assumed position to the right as viewed in Fig. 1, the hydraulic fluid on the right side of piston 8 will tend to be forced out from the right end of chamber 12 through chamber 70 and then via passage 72 and hydraulic pipe 110 all the way over to a passage 116 which leads to an annular chamber 118 on the left side of sleeve-shaped piston 82 (as viewed in Fig. 1). This same fluid under pressure would tend to flow also down hydraulic pipe 108 (from pipe 110) and through passage 106 to annular chamber 104, but, since sleeve-shaped piston 84 is already in its extreme position, the tendency for hydraulic fluid to flow into chamber 104 is arrested since the piston 84 can not move any further to the right (as viewed in Fig. 1) and the hydraulic fluid pressure can not be relieved at this point. The fluid pressure however will be applied to annular chamber 118 as just described and here it will set up a force against sleeve-shaped piston 82 tending to move the piston 82 to the right as viewed in Fig. 1 and thereby to carry flange 86 with it which, in turn, will compress the gas in chamber 92. As before, when the piston 82 moves to the right allowing fluid to flow into chamber 118 from the right side of main piston 8, other hydraulic fluid will be forced out of an annular chamber 120 through a passage 122 and a hydraulic pipe 124 to the hydraulic pipe 98. In hydraulic pipe 98, fluid will flow to the left (as viewed in Fig. 1) to passage 96 which leads to chamber 66, which, in turn, connects to the left side of main chamber 12. This concurrent passage of hydraulic fluid into the left side of chamber 12, which takes place as fluid flows out of the right side of chamber 12, will of course allow piston 8 to be displaced to the right as viewed in Fig. 1, and so will relieve the overload which was applied to the unit. It may be noted that the shock absorber device need not necessarily take the exact structure described, but this structure has great advantage in compactness and efficient location of the elements involved.

It is pointed out that there are annular spaces 126 which are located behind the flanges 86 and 87. These annular spaces 126 will have vent passages (not shown) which lead to the atmosphere to prevent any suction or pressure pockets from being formed. In like manner, there is an annular space 128 which is at the left end of sleeve-shaped piston 82, as viewed in Fig. 1. This space 128 must also have a vent (not shown) to the atmosphere in order to obviate any low or high pressure conditions caused by movement of piston 82 in this space.

There are appropriate seals used throughout the construction of the illustrated device. These may be any type of seal which will operate effectively to prevent any leakage of hydraulic fluid or gas as the case may be. A very satisfactory type of seal is that commonly called an O ring which may be constructed of various pliable materials.

While I have described one specific embodiment of my invention in accordance with the applicable statutes, this is not to be taken in a limiting sense but merely as illustrative of my invention.

I claim:

1. In a hydraulic cylinder and piston, the combination comprising a piston, a piston rod, a cylinder cooperating with said piston and piston rod for producing relative motion between the cylinder and the piston, a gimbal mounting for said cylinder, said mounting comprising hubs on said cylinder, a gimbal ring having bearings for said hubs, fluid passages in said hubs, one end of said passages terminating adjacent to matching recesses in said bearings, and seals between said hubs and bearings to prevent fluid leakage from said fluid passages while transmitting fluid through the swivel joint.

2. The combination according to claim 1 wherein said gimbal mounting is located at one end of said cylinder, and wherein other fluid passages are provided in said gimbal rings for transmitting fluid from a pressure source to said recesses in the bearings.

3. In a hydraulic cylinder and piston, the combination comprising a piston, a piston rod, a cylinder cooperating with said piston and piston rod for producing relative motion between the cylinder and the piston, said cylinder having a gimbal mounting therefor to allow complete freedom from binding in any position of extension of the piston rod, fluid passage means in said gimbal mounting for carrying fluid to and from the cylinder on either side of the piston, a compressed gas chamber surrounding said cylinder and having annular longitudinally slidable end walls, a sleeve-shaped hydraulic piston directly connected to each of said annular end walls and moving therewith, an annular hydraulic fluid chamber containing and being divided by each said sleeve-shaped piston, and hydraulic fluid passages connecting the opposite sides of each sleeve-shaped piston with one side of the main piston so that when a predetermined pressure is reached on either side of the main piston, it will be relieved by displacing fluid from that side and adding fluid to the other side which effect will be reversed by the action of the compressed gas upon the reduction in hydraulic fluid pressure below the predetermined magnitude.

4. In a hydraulic cylinder and piston, the combination comprising a piston, a piston rod, a cylinder cooperating with said piston and piston rod for producing relative motion between the cylinder and the piston, said piston having hydraulic fluid on both sides thereof, said cylinder having a gimbal mounting therefor to allow complete freedom from binding in any position of extension of the piston rod, fluid passage means in said gimbal mounting for carrying fluid to and from the cylinder on either side of the piston, two differential pressure type sealing rings on said piston, a groove on said piston between said sealing rings, a passage connecting said groove with the atmosphere to provide low pressure conditions on one side of each of the sealing rings and so prevent leakage by the piston, and shock absorber means cooperating with the cylinder and piston, said shock absorber means comprising a compressed gas chamber having at least two volume reducing means connected thereto, means operatively connected to each of said volume reducing means and actuated by the fluid pressure on the high pressure side of the piston to reduce the volume of said gas and simultaneously to relieve the pressure on one side of the piston when it exceeds a predetermined magnitude.

5. In a hydraulic cylinder and piston, the combination comprising a piston, a piston rod, a cylinder cooperating with said piston and piston rod for producing relative motion between the cylinder and the piston, said cylinder having a gimbal mounting therefor to allow complete freedom from binding in any position of extension of the piston rod, fluid passage means in said gimbal mounting for carrying fluid to and from the cylinder on either side of the piston, two differential pressure type sealing rings on said piston, a groove on said piston between said sealing rings, a longitudinal passage in said piston rod extending into said piston and being open to the atmosphere at one end, a passage connecting said groove with said longitudinal passage so that each of the piston sealing rings will be exposed to atmospheric pressure on one side and will effectively prevent leakage of fluid by the piston, and shock absorber means cooperating with the cylinder and piston, said shock absorber means comprising a compressed gas chamber having at least two volume reducing means connected thereto, dual fluid chamber means mechanically connected to each of said volume reducing means, and fluid passage means hydraulically connecting said dual fluid chamber means to both sides of the piston so that hydraulic pressure above a predetermined magnitude on either side of the piston will be relieved by said dual fluid chamber means which will allow fluid to flow from the high pressure side of the piston and will supply a corresponding amount of fluid to the low pressure side while the compressed gas chamber will act to restore the displaced fluid to and from both sides of the piston after the hydraulic pressure is reduced below the predetermined magnitude.

6. In a hydraulic cylinder and piston, the combination comprising a piston, a piston rod, a cylinder cooperating with said piston and piston rod for producing relative motion between the cylinder and the piston, said cylinder having a gimbal mounting therefor to allow complete freedom from binding in any position of extension of the piston rod, fluid passage means in said gimbal mounting for carrying fluid to and from the cylinder on either side of the piston, two differential pressure type sealing rings on said piston, a groove on said piston between said sealing rings, an axial passage through said piston rod from one end and extending into said piston, a passage connecting said groove with said axial passage so that each of the piston sealing rings will be exposed to the atmospheric pressure on one side and will effectively prevent leakage of fluid by the piston, a compressed gas chamber surrounding said cylinder and having annular longitudinally slidable end walls, a sleeve-shaped hydraulic piston directly connected to each of said annular end walls and moving therewith, an annular hydraulic fluid chamber containing and being divided by each said sleeve-shaped piston, and hydraulic fluid passages connecting the opposite sides of each sleeve-shaped piston with one side of the main piston so that when a predetermined pressure is reached on either side of the main piston, it will be relieved by displacing fluid from that side and adding fluid to the other side which effect will be reversed by the action of the compressed gas upon the reduction in hydraulic fluid pressure below the predetermined magnitude.

7. In combination with a hydraulic cylinder and piston having a piston, a piston rod, a cylinder cooperating with said piston and piston rod for producing relative motion between the cylinder and the piston, said piston having hydraulic fluid on both sides thereof, shock absorber means cooperating with said cylinder and piston and including a gas compression chamber, said chamber having at least two volume reducing means connected thereto, and means operatively connected to each of said volume reducing means and actuated by the fluid pressure on the high pressure side of said piston to reduce the volume of said gas while relieving the pressure on that side of the piston when it exceeds a predetermined magnitude.

8. In combination with a hydraulic cylinder and piston having a piston, a piston rod, a cylinder cooperating with said piston and piston rod for producing relative motion between the cylinder and the piston, said piston having hydraulic fluid on both sides thereof, shock absorber means cooperating with said cylinder and piston and including a gas compression chamber, said chamber having at least two volume reducing means connected thereto, dual fluid chamber means mechanically connected to each of said volume reducing means, and fluid passage means hydraulically connecting said dual fluid chamber means to both sides of the piston so that hydraulic pressure above a predetermined magnitude on either side of the piston will be relieved by said dual fluid chamber means which will allow fluid to flow from the high pressure side of the piston and will supply a corresponding amount of fluid to the low pressure side while the compressed gas chamber will act to restore the displaced fluid to and from both sides of the piston after the hydraulic pressure is reduced below the predetermined magnitude.

References Cited in the file of this patent

UNITED STATES PATENTS

| | | |
|---|---|---|
| 2,366,832 | Christenson | Jan. 9, 1945 |
| 2,382,457 | Wertman et al. | Aug. 14, 1945 |
| 2,408,980 | Jones | Oct. 8, 1946 |
| 2,420,666 | Joy et al. | May 20, 1947 |
| 2,475,206 | Smith | July 5, 1949 |
| 2,563,194 | Shawbrook | Aug. 7, 1951 |
| 2,679,827 | Perdue | June 1, 1954 |

FOREIGN PATENTS

| | | |
|---|---|---|
| 789,056 | France | Aug. 5, 1935 |